US008316454B2

(12) United States Patent
Valls Fontanals et al.

(10) Patent No.: US 8,316,454 B2
(45) Date of Patent: Nov. 20, 2012

(54) METHOD AND SYSTEM FOR PROTECTION OF USER INFORMATION REGISTRATIONS APPLICABLE IN ELECTORAL PROCESSES (75) Inventors: Pere Valls Fontanals, Barcelona (ES); Jordi Puiggalí Allepuz, Barcelona (ES); Victor Manuel Morales Rocha, Barcelona (ES)

(73) Assignee: SCYTL Secure Electronic Voting S.A., Barcelona (ES)

( * ) Notice: Subject to any disclaimer, the term of this patent is extended or adjusted under 35 U.S.C. 154(b) by 256 days.

(21) Appl. No.: 12/739,766

(22) PCT Filed: Oct. 24, 2007

(86) PCT No.: PCT/ES2007/000599
§ 371 (c)(1),
(2), (4) Date: Jul. 13, 2010

(87) PCT Pub. No.: WO2009/053500
PCT Pub. Date: Apr. 30, 2009

(65) Prior Publication Data
US 2011/0131661 A1   Jun. 2, 2011

(51) Int. Cl.
*G06F 21/00* (2006.01)
(52) U.S. Cl. .......................................... 726/26
(58) Field of Classification Search .................. 726/6
See application file for complete search history.

(56) References Cited

U.S. PATENT DOCUMENTS

| 5,412,727 | A  | * | 5/1995 | Drexler et al. ........... 713/186 |
| 6,553,494 | B1 | * | 4/2003 | Glass ..................... 713/186 |
| 7,047,418 | B1 | * | 5/2006 | Ferren et al. ............ 713/186 |
| 2002/0124176 | A1 | * | 9/2002 | Epstein ................. 713/186 |
| 2002/0128844 | A1 |   | 9/2002 | Wilson |
| 2002/0141621 | A1 | * | 10/2002 | Lane ..................... 382/124 |
| 2003/0012374 | A1 |   | 1/2003 | Wu |
| 2005/0092835 | A1 | * | 5/2005 | Chung et al. ............ 235/386 |
| 2007/0112775 | A1 | * | 5/2007 | Ackerman ................. 707/9 |
| 2007/0157321 | A1 | * | 7/2007 | Errico et al. ............ 726/28 |
| 2007/0194884 | A1 | * | 8/2007 | Didier et al. ........... 340/5.82 |

* cited by examiner

*Primary Examiner* — Michael S McNally
(74) *Attorney, Agent, or Firm* — Hess Patent Law Firm PC; Robert J. Hess (57) ABSTRACT

The present invention describes a method and system for protecting the integrity and authorship of a piece of registration information of the user, applicable in voter information registration, by means of biometric techniques. To that end, after a first stage of entering a piece of registration information, a second stage of protecting the integrity of the registration information is implemented. In this second stage, an item of integrity proof of said information is generated and said item of integrity proof is displayed to the user who wishes to protect it. In a third stage of generating an item of non-repudiation proof of the registration information, an item of biometric proof of the user which contains the item of integrity proof displayed is obtained, an item of non-repudiation proof is constructed from said item of biometric proof, and finally the item of non-repudiation proof is stored.
The invention also includes optional stages which allow verifying the pieces of registration information from the items of non-repudiation proof, as well as verifying the authenticity and uniqueness of the items of non-repudiation proof.

41 Claims, 6 Drawing Sheets

METHOD AND SYSTEM FOR PROTECTION OF USER INFORMATION REGISTRATIONS APPLICABLE IN ELECTORAL PROCESSES

FIELD OF THE INVENTION

Although the present invention is suitable for being used in the protection of a user registration in general, it is fundamentally comprised in the field of processes for registering voter information and introduces a method for the protection of the integrity and authorship of a piece of registration information of a user, such as a voter.

The method can furthermore be used in voter registration environments in a remote manner, in which an in-person identification of the voter to assure the authorship of the registration cannot be performed.

The invention also relates to a system for implementing the mentioned method.

In the present specification, registration information of a user is understood as any type of information which has been provided by said user and for which it is necessary to preserve for an undefined time the integrity of said information and the authorship of the user who has provided it.

BACKGROUND OF THE INVENTION

The continuous expansion of information and communications technologies has allowed the development of remote transactions in recent years. Such development involves new technological challenges such as that of offering security and therefore confidence to the parties involved. One of the main problems is assuring the integrity and authorship of the information provided by the users, both during the transmission of this information and in its long-term storage. The present invention describes a method for the protection of the integrity and authorship of a user information registration, applicable in remote and/or in-person voter registration environments. This invention describes how the items of integrity and authorship proof of the registration information are generated using biometric techniques and how a verification of said items of proof can be carried out.

Carrying out a remote registration provides greater convenience to the users since they do not have to travel to a registration office. However, such registration has several security risks such as the possibility of altering the registration information of the user, either while it is sent or even once the registration information has reached its destination. This alteration could affect both the integrity of the contents of the information and the authorship of said information, i.e., the modification or supplantation of the identity of the author who has provided the information. It is therefore important to preserve the integrity and authorship of this information at all times.

There are currently proposals which protect the integrity and authorship of the information by means of using digital signatures. By definition, a digital signature protects the integrity of the information represented in electronic format and links it to the person who generates it. The digital signature thus serves to carry out the identification of the party emitting the data and also to verify that the contents have not been manipulated once signed. In addition, the use of digital signatures has two limitations: the need to provide the users with a digital certificate and the need to require the users to have cryptographic means for generating a digital signature from their user certificate. This limits the use of these proposals to those environments in which the users have digital certificates and devices with cryptographic capacities for generating a digital signature, such as a personal computer for example. These proposals include inventions WO0120431A2, US20020138341A1 and WO2004070665, which attempt to solve the problem of protecting the integrity and authorship of a remote electronic voter registration only by means of digital signatures.

As an alternative measure to the problems that digital signatures entail, there are solutions which propose using biometric measurements (for example fingerprints, iris recognition, voice recognition, etc.) to carry out the authentication and generation of electronic data in in-person as well as in remote environments. An example is invention US20040143556A1, which describes the use of biometry to protect the authorship of an electronic document. This method only uses voice as a biometric technique. In said method, the user must say a personal identification number (i.e., a key word) which is randomly generated during the process for protecting information (in addition to other data such as the user name, date, etc.). The voice is registered and this registration is attached to the information to be protected. The main problem of this invention is that it does not actually protect the integrity of the electronic document, since the biometric parameter is independent of the content of the document. The information of the document could thus be subsequently modified, attaching it to the voice registration and the information would continue to be considered value. Another method using biometric means for voter registration is the one contained in invention US20060289638. In this invention the registration information is based only on a biometric sample of the voter, which can be a fingerprint or any other biometric measurement. The voter performs the registration by appearing physically before a registration authority, which identifies the voter in-person before capturing a biometric registration of said voter. Said biometric registration will subsequently be used during a voting phase to identify the voter. The main problem of this invention is that it requires the voter to appear physically at a registration center; therefore it is not aimed at facilitating remote registration. In addition, it does not mentioned how the integrity of the registration information of the voter associated with the biometric registration can be protected. Thus, the stored voter registration could be manipulated to assign a different identity to the biometric registration captured from the voter, and thus supplant a person.

In the field of remote voter registration in which biometric measurements are used, invention US20050092835A1 also stands out. In this invention the voter downloads to his personal device, through a communication network, an application which allows him to enter the registration information as well as capture his handwritten signature by means of a capturing device (digitizing tablet). The digitized handwritten signature is attached to the registration information, encrypted and transmitted through a communication network to be stored by a registration authority. Despite the fact that the proposed method facilitates remote registration, it involves the voters having a digitizing tablet for performing said registration. It therefore restricts the fields of supported devices for performing the registration. It does not protect the integrity of the registration information either, since the digitized signature could subsequently be attached to other registration information without it being detected.

To solve the problem of the integrity of the registration of the previous patents, other proposals combine the use of biometric measurements with the digital signature. The objective of these methods is to associate the registration information with a piece of biometric information by means of this digital signature, preventing them from being able to be disassociated without it being detected. Examples of the combination of biometric measurements and digital signature are present in inventions WO0108352A1 and WO2007034255A1. Invention WO0108352A1 describes a method in which a user digitally signs electronic documents together with a biometric parameter of the user obtained at the time of the signature. The objective is to have an item of proof of presence of the proprietor of the signature at the time it was performed. An illegitimate person who has obtained the digital certificate of the user in a fraudulent manner is thus prevented from performing the digital signature. The problem of this invention is the same as that of the methods which only use the digital signature described above: the use is limited to those users having a digital certificate and means for using it.

Invention WO2007034255A1 describes another method for the protection of information by means of biometric techniques and a digital signature, which does not require digital certificates for users. This invention generates an item of biometric proof of the document by concatenating a biometric registration of the user, preferably an image of the handwritten signature, together with a digest or hash of the document (obtained by means of a one-way function). The item of biometric proof is encrypted, attached to the document, and a representative or intermediary uses a private key to digitally sign this set of information. Once digitally signed, the set of data is sent to the destination through a communications network. The limitation of this method is that the integrity of the information depends entirely on cryptographic techniques: the encryption and the digital signature. The biometric registration and the hash of the document contained in the item of biometric proof are linked by the digital signature of a third party. Therefore, there is the risk that the person who generates the digital signature manipulates the data (modifies the document, generates a new hash, concatenates it and encrypts it with the biometric registration of the user, and signs it again). Although in this case it is not necessary for the voter to have a digital certificate for signing, the need to encrypt the information also involves use restrictions to platforms allowing documentation encryption.

As a summary, inventions WO0108352A1 and WO2007034255A1 do not implement a method in which the biometric parameter itself contains information protecting the integrity of the document. The described methods therefore require the use of cryptographic techniques to associate a piece of information with the item of biometric proof and protect the integrity of this association. The user can therefore repudiate "his signature", i.e., the user can claim that the registered document is not the same as the one which was associated to his biometric parameter.

Finally, in addition to the inventions described, there are mechanisms which use biometric techniques to generate cryptographic keys which allow signing documents or remote electronic transactions. The main purpose of these mechanisms is to offer integrity of the data through the digital signature and at the same time prevent supplantation. For example, the proposal of Hao Feng and Chan Choong Wah (Hao Feng, Chan Choong Wah, 2002. "Private key generation from on-line handwritten signatures. *Information Management & Computer Security*. ISSN: 0968-5227 Volume: 10 Issue: 4 Page: 159-164) describes a digital signature based on biometry, in which a pattern obtained from a biometric characteristic is used as a basis for generating the pair of keys (public and private). The user can sign digitally once his biometric identifier is captured and his private key is regenerated, said key would thus be prevented from being stored in a device and therefore exposed to being used by means of supplantation. These digital signature mechanisms based on biometry still have concurrence problems, since the precision in capturing the biometric parameter is subject to small differences in each capture. Therefore, when the private key is regenerated during the signature session, said key might not concur with the pair of keys generated originally and in this case the user could not carry out the signature.

BRIEF DESCRIPTION OF THE INVENTION

The present invention describes a method which allows protecting the integrity and authorship of a remote user registration by means of biometric techniques and without needing to use a digital signature. The present invention describes a method which allows generating this user registration in a secure remote manner. The present invention describes as part of the method the generation of an item of non-repudiation proof created from an item of biometric proof containing an item of integrity proof of the registration information. The present invention describes a method for the generation of an item of non-repudiation proof of the registration information which can be implemented using standard devices. The method also describes the audit processes supported by the user registrations protected by the method.

The method particularly provides an item of non-repudiation proof of a user information registration using biometric techniques, which allows assuring certain properties necessary in a process for registering user information, such as the integrity of the registration information provided by the user and the identity of the user who has provided the registration data. This item of non-repudiation proof prevents the addition of false registrations, the modification of registrations or the supplantation of the user related to the registration information.

The method of the invention is therefore suitable for the protection of the integrity and authorship of a piece of registration information belonging to a user and can be used for a registration of said user as a voter.

In a basic implementation, the method comprises the following stages:
 a) Entering a piece of registration information;
 b) Protecting the integrity of the registration information; and
 c) Generating an item of non-repudiation proof of the registration information.

In a preferred implementation, stages a) and b) are performed in a registration module and stage c) in a validation module. It is also contemplated that a single module is in charge of said stages, therefore the references appearing hereinafter about the registration module and the validation module as separate entities can also be interpreted as references to a single module.

The particularities of the mentioned stages are explained below in more detail.

The stage of entering the registration information is performed by the user himself, particularly a voter, using a registration module or providing said information to a registrar responsible for entering, in a controlled environment, said registration information in the registration module. The registration information can be provided in different formats, such as physical, analog or digital formats.

The stage of protecting the integrity of the registration information implements the following steps:
 Generating an item of integrity proof of the registration information from at least said registration information; and
 Displaying the item of integrity proof to the user.

The item of integrity proof of the registration information can be generated by means of different methods from the registration information. Said methods are detailed below.

The item of integrity proof can be displayed to the user directly from the registration module which has generated it, or through an intermediary such as a registrar or another module different from the registration module (e.g., the validation module). The objective of displaying the item of integrity proof to the user is to facilitate the generation of the item of non-repudiation proof from said item of integrity proof. The item of integrity proof can be displayed to the user in different formats, such as a physical format or from a piece of analog or digital information.

The stage of generating an item of non-repudiation proof of the registration information is performed by means of the following steps:

Acquiring an item of multiformat biometric proof (e.g., voice, image, writing or a combination thereof) of the user which contains the item of integrity proof;

Creating the item of non-repudiation proof using at least the item of multiformat biometric proof acquired; and Storing the item of non-repudiation proof.

Acquiring the item of biometric proof consists of obtaining a biometric registration of the user which contains the item of integrity proof displayed. Said biometric registration could adopt different formats such as a voice, written or visual registration. The different methods and formats for acquiring the item of biometric proof are detailed below in the detailed description of this method.

The objective of creating the item of non-repudiation proof is to have a piece of information which can subsequently be used to verify the integrity and authorship of the registration information of the user. Different methods for creating the item of non-repudiation proof are also detailed below.

In a preferred implementation, the item of non-repudiation proof would be stored in the validation module, although it could be stored in other independent modules. The objective of storing the item of non-repudiation proof is to facilitate a time-independent verification of the integrity and authorship of the registration information.

Finally, the method also contemplates optional stages defining process for auditing the registration information and/or the items of non-repudiation proof stored.

BRIEF DESCRIPTION OF THE DRAWINGS

FIG. 1a describes how a user 101 provides a piece of registration information 103 to a registration module 102. The processes involved in this FIG. 1a are:

Entering 201 the registration information 103 of the user 101 in the registration module 102;

Generating 202 an item of integrity proof 104, which is carried out by the registration module 102 from the registration information 103; and Displaying 203 the item of integrity proof 104 generated by the registration module 102 to the user 101.

FIG. 1b describes how the user 101 interacts with a validation module 106 to generate an item of non-repudiation proof 107 of the registration information 103. This entails the following processes:

Capturing 204 an item of biometric proof 105 of a user 101 which contains an item of integrity proof 104, using a validation module 106;

Generating 206 an item of non-repudiation proof 107 from the item of biometric proof 105; and Storing 206 the item of non-repudiation proof 107 by means of the validation module 106.

FIG. 3 shows the interaction between the user 101 and a registration module 102 by means of an interface 401 consisting of a computer connected to the registration module by means of a communication network, such as Internet. In the example shown in FIG. 4, the interface 401 used by the user 101 to interact with the registration module 202 likewise consists of a computer, but in this example the registration module 102 is contained in said computer. Finally, FIG. 5 describes an implementation example in which the interface 401 consists of a telephony network.

In FIG. 6, the item of biometric proof 105 of the user 101 is obtained through a voice emission of the user. To that end, an interface 402 capable of capturing a voice registration, such as a microphone or a telephone, is used. FIG. 7 shows an example in which the item of biometric proof 105 of the user 101 is captured from a handwritten registration of the voter, such as the signature of a paper containing the printed item of integrity proof, the writing by hand of the item of integrity proof or both. The possibility of using as an item of biometric proof a paper support with a watermark containing the item of integrity proof 104, and on which the user 101 performs a handwritten signature, is also contemplated. The interface 402 used in this example would be a paper support transmission mechanism, such as postal service, or an interface for capturing an image from a paper support and sending said capture to the validation module 106.

FIG. 9 shows an example of an optional stage of the present invention. The objective of this stage consists of detecting duplicate registrations of items of non-repudiation proof 107. To carry out the process, the starting point is an item of non-repudiation proof 107 and a process for extracting 304 the item of biometric proof 105 used to generate said item of non-repudiation proof 107 is applied thereto. An algorithm for obtaining 305 an item of identity proof 109 of the user 101 who generated the item of biometric proof 105 is then applied to the item of biometric proof 105. The same processes for extracting items of biometric proof 304 and obtaining an item of identity proof 305 are also applied to the set of stored items of non-repudiation proof 107c, obtaining a set of items of identity proof 109c from the set of items of non-repudiation proof 107c. Finally, a comparison 306 is carried out to verify if the item of identity proof 109 is already in the set of items of identity proof 109c. The objective is to determine if the item of non-repudiation proof 107 has been generated by a user who has already generated an item of non-repudiation proof in the set 107c.

DETAILED DESCRIPTION OF THE INVENTION

The present invention relates to a method and a system for protecting the integrity and authorship of a piece of registration information of a user, by means of creating an item of non-repudiation proof of said information using biometric techniques. The main feature of this invention is based on the fact that it is not necessary to use public key cryptographic algorithms, such as a digital signature, to generate said item of non-repudiation proof. This feature facilitates the secure remote user information registration using standard means which do not have biometric capturing devices, such as telephones or the postal service.

Despite the fact that this invention is fundamentally comprised in the field of processes for registering voter information, this invention can also be applied to other different fields for generating an item of non-repudiation proof from a piece of information provided by a user. An example would be the protection of the integrity and authorship of digital or handwritten documents. Any reference made to a voter or registration information of a voter hereinafter can thus be interpreted more generically as a reference to a user or to a piece of registration information of a user. It is important to emphasize that the objective of the item of non-repudiation proof generated in this invention is the simultaneous and long-term protection of the integrity and authorship of a piece of information entered. Therefore, the scope of the invention is not considered to include the use of the proposed method only as an access control measure by means of verifying the identity of a user, without comprising the generation and storage of the item of non-repudiation proof. Furthermore, one and the same piece of registration information could be protected by one or more items of non-repudiation proof generated by different users as co-authors of said piece of information.

To put this invention into practice, the use of a registration module in which a piece of information to be protected is entered, which will be identified as registration information, is proposed. Said registration module will also generate an item of integrity proof of the registration information, necessary for the subsequent generation of an item of non-repudiation proof. Optionally, although it is not essential, the registration module could store the registration information. The invention also uses a second validation module in which the item of non-repudiation proof obtained will be generated and stored using biometric characteristics of the voter. Said item of non-repudiation proof will protect the integrity and authorship of the registration information. Optionally, the registration and validation modules could be connected to one another by means of a communication network or they could share storage media.

The registration module can be implemented in an isolated manner (i.e., in a single computer) or in a distributed manner (i.e., in different computers). In the case of a distributed implementation, the different components of the registration module could be connected to one another using communication means. These means could be analog or digital. In the case of analog means, the use of telephone communication means or equivalent means such as communication modems, telephone terminals or fax, is contemplated. In the case of digital means, a communication recording network such as Internet, a point-to-point network, a USB serial port connection, are contemplated. The registration module has a data input and output interface to facilitate entering the registration information to be protected and display an item of integrity proof of said entered information. This interface can be physical, analog or digital. In the case of a physical interface, a possible implementation would be by means of a form in paper format or another support which facilitates entering and/or displaying information in handwritten or written form. A tactile form, such as in Braille format, would also form part of a physical implementation interface. In the case of an analog interface, the use of audible or visual means facilitating the registration and/or playback of a piece of information in analog format is contemplated. Examples of an analog interface would be a telephony or videoconference system. In the case of a digital interface, any input-output interface available in a computing device such as a personal computer, PDA, mobile telephone or equivalents, is contemplated. Possible implementations of digital interfaces, without limiting the invention thereto, would be a website, a specific registration application, a word processing application or a PDF form. The registration module will have at least in one of its components computing means for processing at least the registration information and/or generation of an item of integrity proof of at least said registration information. Optionally, the registration module could have digital and/or analog storage media for storing at least the registration information and/or the item of integrity proof.

The validation module can be implemented in an isolated manner (i.e., in a single computer) or in a distributed manner (i.e., in different computers). In the case of a distributed implementation, the different components of the validation module could be connected to one another using communication means. These means could be analog or digital. The validation module has a data input and output interface to facilitate capturing the information necessary for generating the item of non-repudiation proof. This interface can be physical, analog or digital. In the case of a physical interface, a possible implementation would be by means of a paper or another equivalent support which facilitates displaying and entering at least handwritten or tactile biometric information. In the case of an analog interface, the use of audible or visual means which facilitate recording a piece of information in analog format such as a voice or image is contemplated. In the case of a digital interface, any input-output interface available in a computing device facilitating the representation of information in a visual, audible or tactile manner and/or facilitating the capture of handwritten, visual, physical or audible biometric information of a person is contemplated. The validation module also has digital and/or analog storage manes for storing at least the item of non-repudiation proof obtained from the captured biometric information. Finally, the validation module can have, in at least one of its components, computing means for processing at least the item of non-repudiation proof.

The invention also contemplates that the registration module and the validation module are one and the same module. Thus, any reference appearing hereinafter about the registration module and the validation module as separate entities can also be interpreted as references to a single module performing both functions.

Figure 1A:
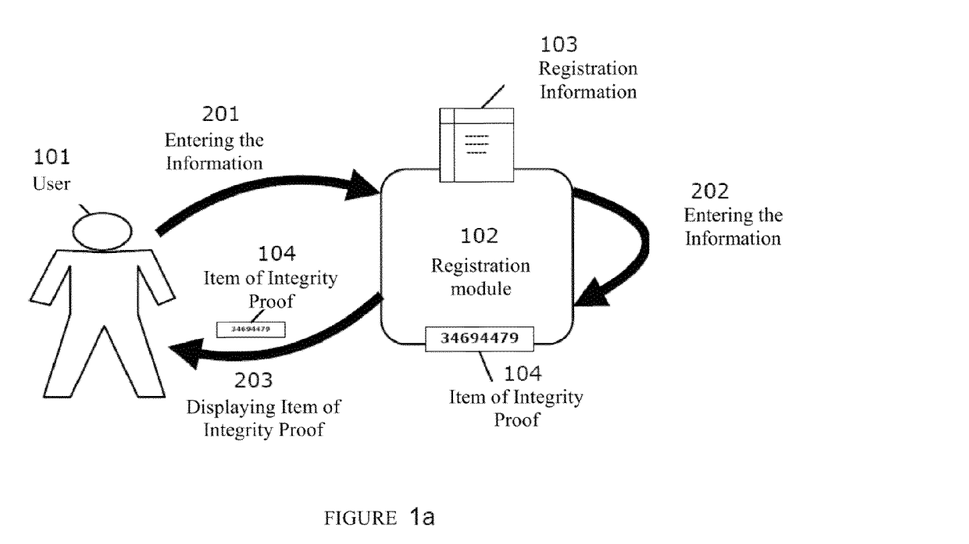
FIGS. 1a and 1b show the main elements on which the method of registration described in the present invention is implemented.
Figure 1B:
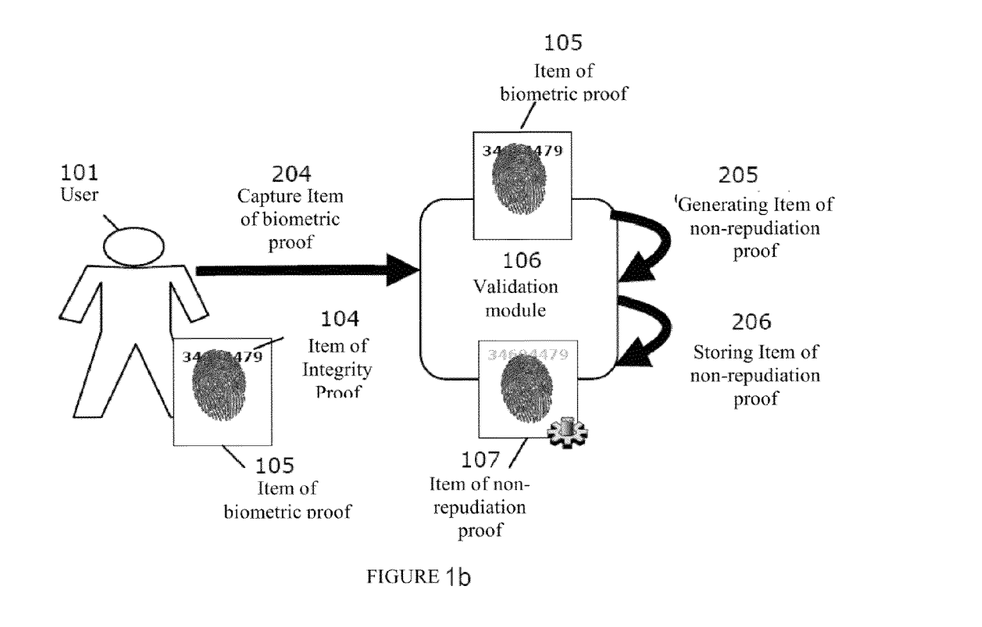
Figure 2:
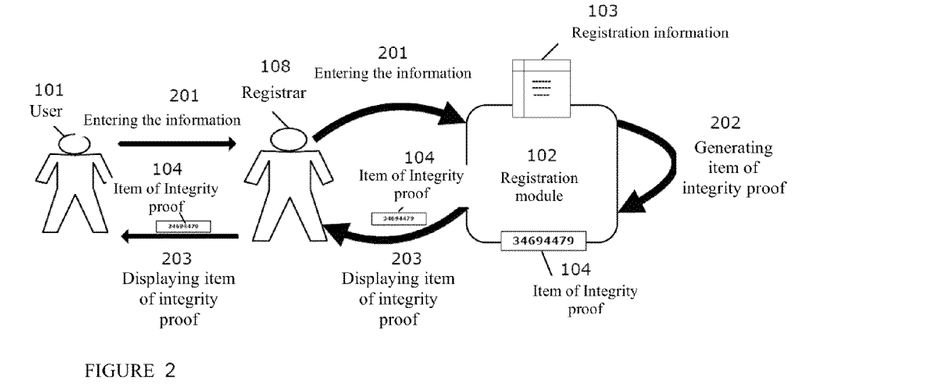
FIG. 2 shows an alternative implementation in relation to the example of FIG. 1a of the method of the present invention. In said implementation, the registration information 103 is entered 201 by a registrar 108 in a controlled environment, acting as an intermediary between the user 101 and the registration module 102.
Figure 3:
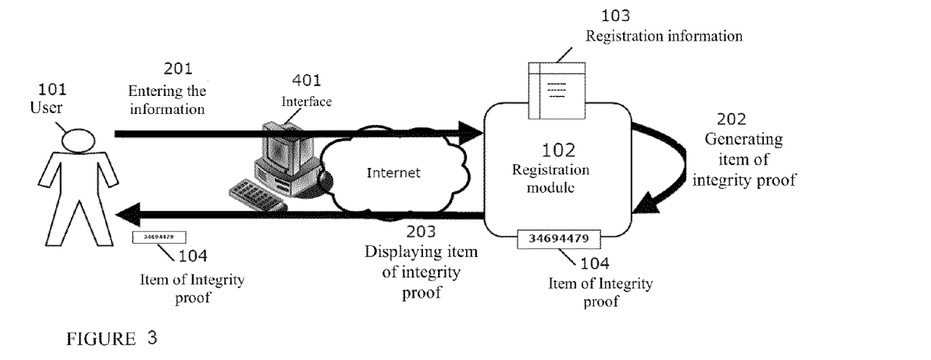
FIGS. 3, 4 and 5 show different alternative interfaces for the implementation of the processes for entering 201 the registration information 103 and displaying 203 the item of integrity proof 104 to the user 101, described in the example of FIG. 1a of the method of the present invention.
Figure 4:
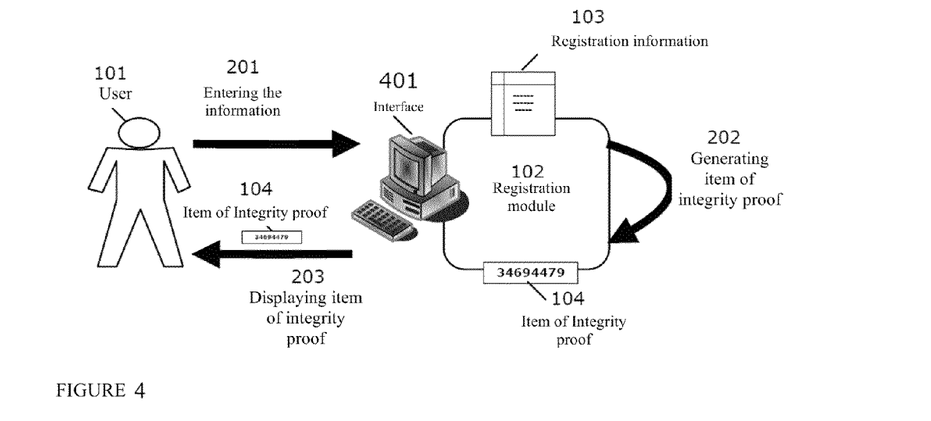
Figure 5:
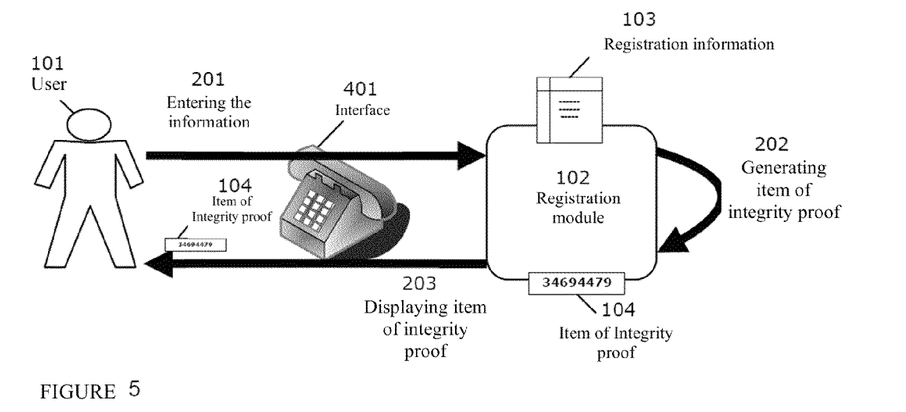
Figure 6:
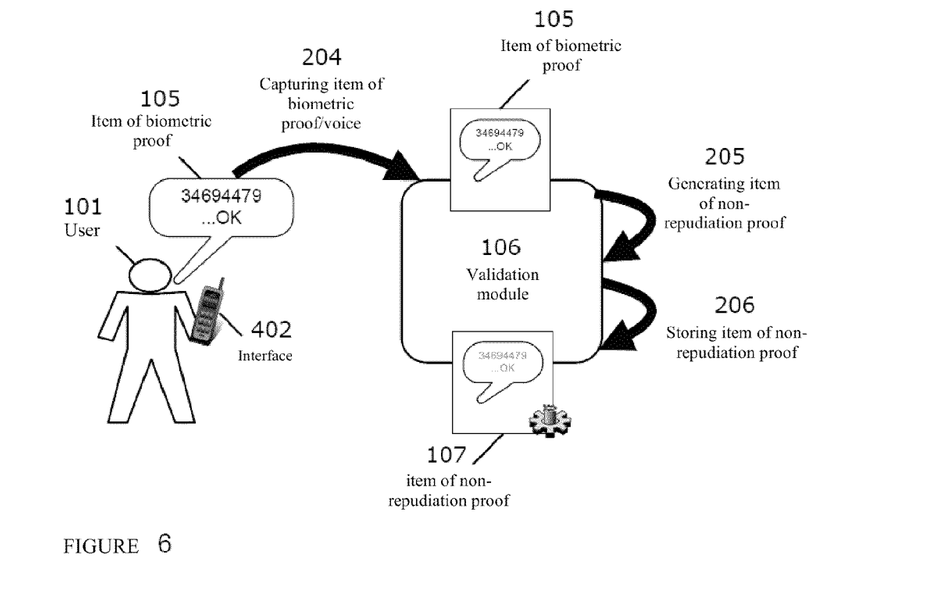
FIGS. 6 and 7 show alternative processes for capturing an item of biometric proof in relation to the example of FIG. 1b of the method of the present invention.
Figure 7:
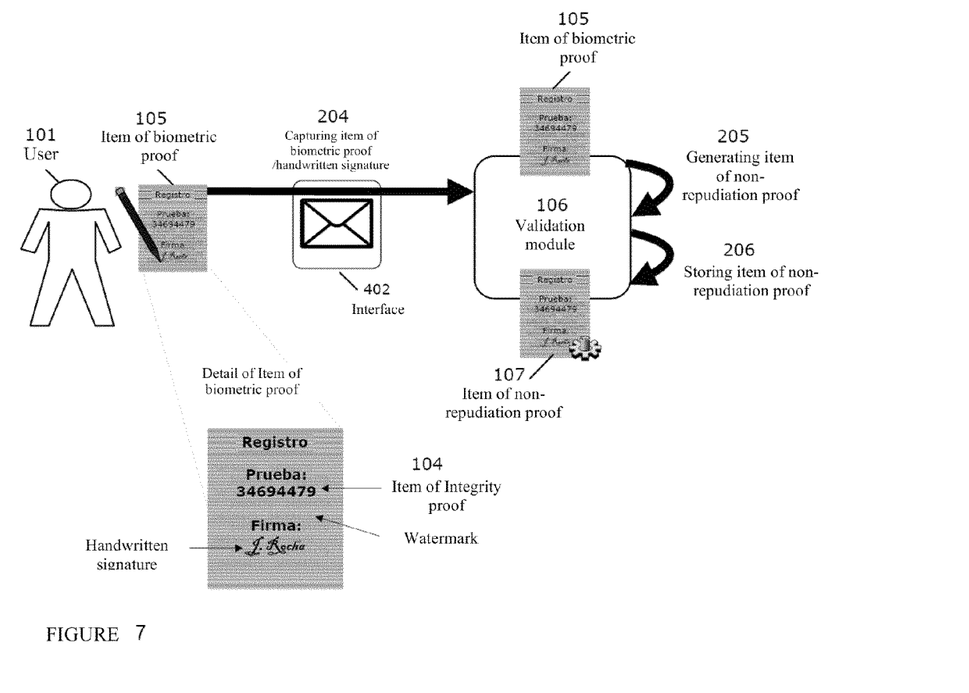
Figure 8:
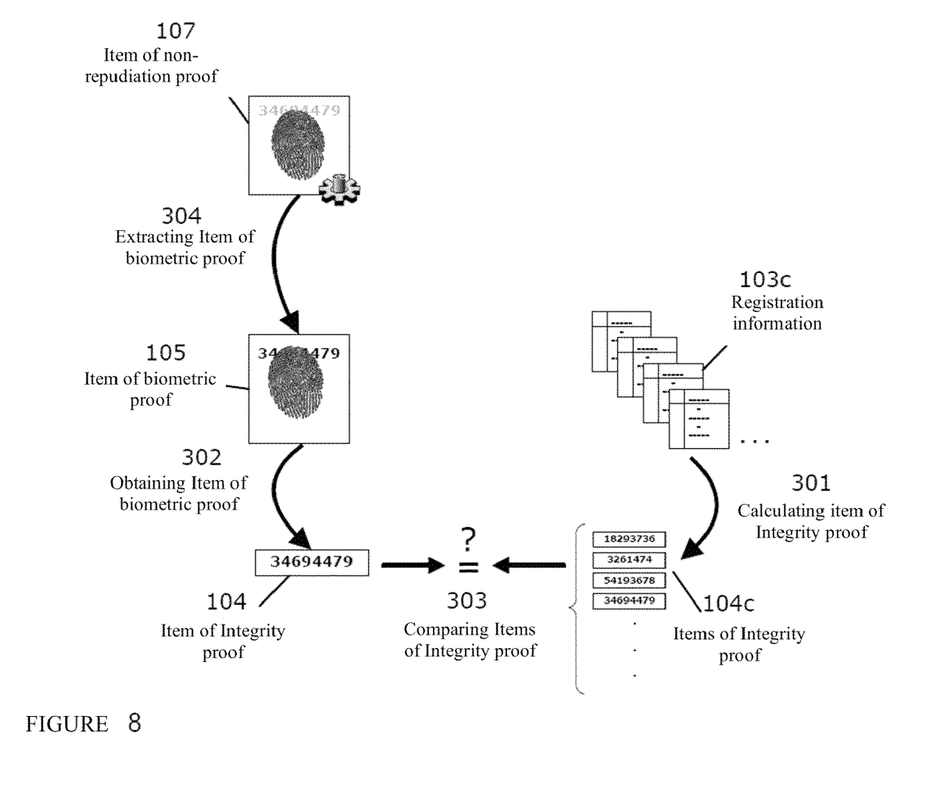
FIG. 8 shows an example of an optional stage of the present invention which consists of validating the items of non-repudiation proof 107. In this stage, a process for extracting 304 the item of biometric proof 105 from the item of non-repudiation proof 107 is carried out. A second process for obtaining 302 the item of integrity proof 104 from the item of biometric proof 105 is then carried out. In addition, the calculation 301 of the items of integrity proof 104c of the previously stored pieces of registration information 103c is performed. Finally, a process for comparing 303 the item of integrity proof obtained from the item of non-repudiation proof 104 with the items of integrity proof 104c obtained from the pieces of registration information 103 is carried out. The purpose of this comparison is to detect if the item of non-repudiation proof 107 matches any of the previously stored pieces of registration information 103c.
Figure 9:
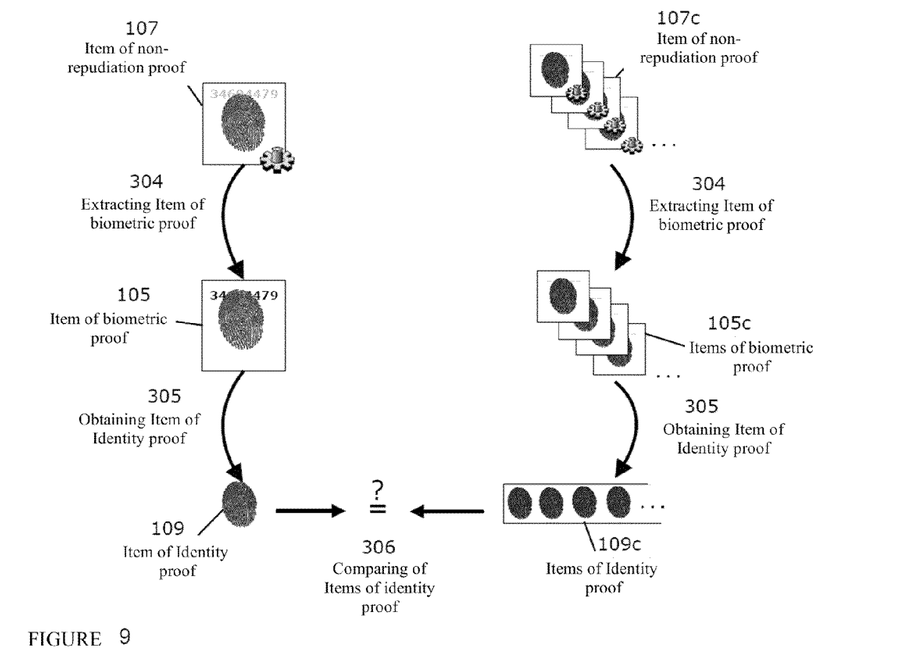
Figure 10:
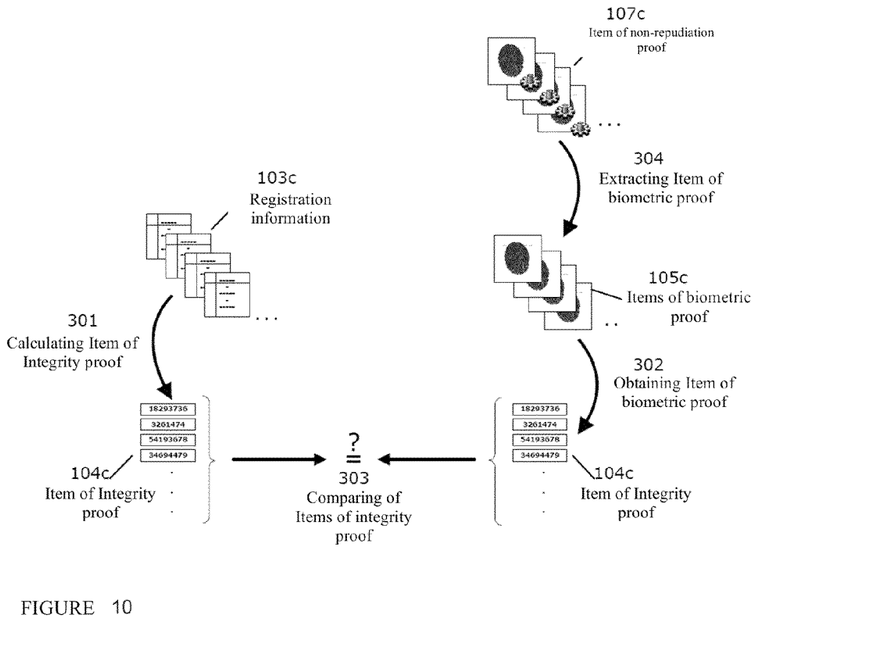
FIG. 10 shows an optional stage of the present invention, which consists of verifying if there is an item of non-repudiation proof 107 for each piece of stored registration information 103. The set of the items of integrity proof 104c is calculated 301 from a set of stored registration information 103c. In addition, the set of items of biometric proof 105c is extracted 304 from the set of the stored items of non-repudiation proof 107c. Then, the set of items of integrity proof 104c, belonging to the set of the stored items of non-repudiation proof 107c, is obtained 302 from the set of items of biometric proof 105c. Finally, the comparison 303 of the sets of items of integrity proof 104c obtained in both processes is carried out for the purpose of detecting which are the items of integrity proof 104 which do not appear in the set of items of integrity proof 104c obtained from the stored items of non-repudiation proof 107c.

The registration and/or validation modules may be executed in the same computing means (e.g., a computer) or share components, such as the communication, storage, computing and/or input/output means. FIGS. 2, 3, 4, 5, 6 and 7 describe different examples supported by this invention for the implementation of these modules.

In a preferred implementation, the invention starts with a first stage of entering the registration information to be protected using the physical, analog and/or digital interface provided by the registration module. This information could be entered by a user who is the proprietor of said information (e.g., a voter) or another person or system which will interact in a controlled environment with the registration module on behalf of the user and which will be identified as registrar. In the case of a physical interface, the registration information could be entered from a form in paper format or another physical medium using a scanner or the like. In the case of an analog interface, the possibility of entering the information using locally or remotely accessible means would be considered. Possible scenarios contemplated in this analog implementation would be the use of a telephone or videoconference platform from which the information could be entered by connecting with a telephone or videotelephone. In the case of a digital interface, the registration information could be entered by using a file in electronic format and sending it to an electronic address, or the process for entering the information could be performed by means of an interactive program. Possible scenarios contemplated in this case would be, without intending to limit the invention thereto, sending a text file, PDF form or another format which can use a text editor to an e-mail address, a web form or a specific interactive application designed to enter the registration information.

The entered registration information could have a pre-established format, such as a form with the necessary fields for the electoral registration of a voter, for example. This form could be provided to the voter or registrar by the same registration module as part of the interface for entering information. In this case, the necessary registration information could be entered in the registration module using the same format of the form or using a different one. For example, the voter or registrar could use a form in an electronic format provided by the registration module, print it, fill out the printed copy and send the latter to a registrar so that such registrar can enter it in the registration module. Optionally, the fields of the form could show a piece of information previously stored in the registration module to facilitate the process for entering the information.

Once the registration information has been entered, a stage of protecting the integrity of said registration information in the registration module will be performed. The stage of protecting the integrity will consist of a first step in which an item of integrity proof will be generated from the registration information entered. This item of integrity proof can be obtained by applying a hash function, such as a cryptographic hash function, to the registration information. As examples of cryptographic hash functions, without limiting the invention to the use thereof, SHA1, SHA2 or MD5 could be used. The possibility of using MAC (Message Authentication Code) cryptographic functions, using a key known by the voter, the registrar and/or the registration module, is also considered. As examples of MAC cryptographic functions, CBC-MAC, HMAC or UMAC type cryptographic functions can be used. In an alternative implementation, the item of integrity proof can be generated using data compression functions. Examples of compression functions, without limiting the use thereto, would be those provided by programs such as GZIP, RAR or WinZIP. In another alternative implementation of the invention, the use of hash functions is dispensed with, and a representation of the partial or complete content of the registration information would be used as an item of integrity proof.

In a second step of the stage of protecting the integrity, the item of integrity proof is displayed to the voter so that he can note it down, print it, memorize it or store it for its subsequent use. To that end, said information will be transformed into a format which allows the voter to understand it, note it down, print it or store it. Examples of formats, without limiting the field of application thereto, would be an alphanumeric representation of the information, a graphic representation such as a barcode, an audible representation or a tactile representation. The possibility of using a representation combining several of these representations is also considered. In an alternative implementation, a partial piece of information of the item of integrity proof would be displayed to the voter to facilitate usability. In this sense, a representation obtained from a subset of the most significant bits, the least significant bits or a subset of random bits of the item of integrity proof could be displayed.

The invention also contemplates optionally that the registration information, the item of integrity proof and/or any other information provided by the voter during the stage of registering are encoded. This encoding can be performed by the voter or registrar before entering the registration information and/or displaying the item of integrity proof. The encoding could be performed by means of classic encryption techniques (e.g., substitution codes), modern encryption techniques (e.g., symmetric or asymmetric encryption), visual encryption techniques or watermark techniques.

Also optionally, the protection of the integrity of the registration data, item of integrity proof and/or any other information provided by the voter during the process for registering, using public key cryptography such as a digital signature, is contemplated. In this sense, the registration information and/or the item of integrity proof, which could be previously encoded, could be digitally signed with a private key belonging to the voter, to the registrar, to the registration module or another external system such as a timestamp server. The resulting digital signature could be included in the signed information to form part of it. This digital signature could be performed and displayed to the voter together with the item of integrity proof, in the second step of the stage of registering.

Once the item of integrity proof has been displayed to the voter, a second stage of generating the item of non-repudiation proof of the registration information entered will be initiated. The initiation of this stage is not considered critical in time, therefore, depending on the situation, it can be performed in a wide time interval after the end of the stage of registering (e.g., hours, days, etc.). It can also be implemented using a validation module having interface features different from those of the registration module (e.g., using a digital interface in the registration module and an analog interface in the validation module). To that end, the voter will use the validation module in which a first step of capturing an item of biometric proof containing the value of the item of integrity proof will be performed. This item of biometric proof could be a registration of the voice of the voter, a handwritten registration or any other item of biometric proof which the integrity registration can contain. To that end, the registration module will display the item of integrity proof to the voter in a format in accordance with the item of biometric proof which must be generated, such as a legible, audible or printable format, for example.

In the event that the item of biometric proof is a voice registration, this registration will contain at least the description of the content of the item of integrity proof and a registration of the voice of the voter. This item of biometric proof can be a recording of the voice of the voter describing the content of the item of integrity proof (e.g., a recording of the voter enunciating the digits of the item of integrity proof). It can also be the recording of an audible representation of the item of integrity proof together with the voice of the voter (e.g., accepting said item of proof). This recording could be in digital format, analog format or any other format which can be processed to obtain an identification of the voter by means of his voice. The recording could contain other additional voice registrations of the voter or third parties, as well as sounds which can be processed (e.g., the tones or pulses generated when pressing the keys of a telephone).

In the event that the item of biometric proof is a handwritten registration, this item of proof will contain at least a legible representation of the item of integrity proof and a handwritten acceptance of the voter. The item of biometric proof can contain the writing by the voter of the item of integrity proof. It could also be a handwritten signature performed by the voter on a visible representation of the item of integrity proof. The visible representation of the item of integrity proof could be a printed or graphic representation of the item of integrity proof, such as an alphanumeric representation or a barcode. Optionally, the visible representation of the item of integrity proof could contain the item of integrity proof encoded by means of watermark or visual encryption techniques.

This invention can also be implemented with other biometric techniques apart from those mentioned, such as a visual registration, fingerprint registration or other existing ones. Whichever the biometric method used, the item of biometric proof can optionally contain an additional piece of audit information of said item of proof, such as a time registration of when it was performed and/or information of the process for which this item of proof is valid.

Once the item of biometric proof has been obtained, a second step of obtaining the item of non-repudiation proof will be performed. The item of non-repudiation proof will contain at least the item of biometric proof. Thus, in a preferred implementation, the same item of biometric proof will be used as an item of non-repudiation proof. Optionally, the item of non-repudiation proof could also contain other additional information such as the item of integrity proof and/or additional information related to the identity of the voter, an identifier of the registration form or other information which can be considered relevant. The item of non-repudiation proof could be generated in digital, analog or physical format. Examples of implementation of an item of non-repudiation proof could consist of a paper with the item of handwritten biometric proof of the voter, a voice recording of the voter or an electronic file containing the item of biometric proof in this format.

Optionally, the item of non-repudiation proof could be protected by means of encoding techniques. This encoding can be performed by the voter or be performed by the registrar. The encoding could be performed by means of classic encryption techniques (e.g., substitution codes), modern encryption techniques (e.g., symmetric or asymmetric encryption), visual encryption techniques or watermark techniques. In this sense, the result of the encoding would be considered as the item of non-repudiation proof.

Also optionally, the integrity of the item of non-repudiation proof could be protected by using public key cryptographic techniques such as the digital signature. In this sense, the item of non-repudiation proof could be digitally signed with a private key belonging to the voter, to the registrar, to the validation module or another external system such as a timestamp server. The resulting digital signature could be added to the item of non-repudiation proof to form part of it.

In a last step of the stage of creating the item of non-repudiation proof, this item of non-repudiation proof is stored in a physical, digital or analog storage unit in accordance with the original format said item of non-repudiation proof. Examples of storage would be a physical file, hard disk or magnetic tape. This storage could be carried out in the same validation module or another different module. Optionally, the item of non-repudiation proof could be stored in a format different from the original one and in accordance with the storage medium. For example, an item of handwritten non-repudiation proof could be stored in digital format, such as a scan of said item of proof. Another contemplated possibility is that the item of non-repudiation proof is stored in original format and a copy in a different format facilitating its subsequent processing. The items of non-repudiation proof may be stored grouped in one and the same storage unit or individually. Optionally, an additional piece of information, such as a time register, identifier of the voter or other information which may be considered relevant for an audit may be stored together with each item of non-repudiation proof.

The invention contemplates an optional stage which would consist of the storage of the registration information. This storage could be performed in digital, analog or physical format. Digital storage formats are understood as any format allowing the storage thereof in digital means such as a hard disk. Analog format is understood as any format allowing the storage thereof in analog devices such as an audible and visible format. Physical format is understood as those formats allowing the storage in a physical medium such as a format which allows printing the information. Optionally, the item of integrity proof can also be stored together with the registration information. It could be stored in the registration module, validation module or in a third system.

Optionally, before performing the storage of the item of non-repudiation proof and/or before this storage, the invention contemplates the implementation of a stage of validating the items of non-repudiation proof. This stage consists of verifying that the item of integrity proof contained in the item of biometric proof used to generate the item of non-repudiation proof matches the item of integrity a previously entered voter information registration. In the event that said voter information registration does not exist or that the item of integrity proof of the item of non-repudiation proof does not match the item of integrity proof of the voter information registration, the storage of the item of non-repudiation proof could be canceled or the non-repudiation registration could be marked as non-validated. In the affirmative case, the item of non-repudiation proof would be stored if necessary and/or the voter registration would optionally be marked as validated. In a preferred implementation of this stage of validating the items of non-repudiation proof, the item of integrity proof of the item of non-repudiation proof is extracted from the item of biometric proof contained in the item of non-repudiation proof. This is done by using an algorithm for processing the information contained in the item of biometric proof. This algorithm would be related to the format in which the item of biometric proof has been generated. For example, in the event that it is an audible registration, the information will be obtained from an algorithm for identifying words, tones or pulses. In another preferred implementation, the item of integrity proof obtained from the item of non-repudiation proof could be stored in a manner annexed to the item of non-repudiation proof.

The invention also contemplates the optional implementation of another stage of detecting duplicate non-repudiation registrations, and it can be implemented before or after storing the item of non-repudiation proof. This stage consists of detecting if there is more than one non-repudiation registration stored which has been generated by the same voter. In a preferred implementation, this validation is performed by extracting an item of identity proof of the voters who have generated the items of non-repudiation proof from the item of biometric proof contained in the items of non-repudiation proof which are being verified. Once the items of identity proof have been extracted, it is verified if two or more items of non-repudiation proof have items of identity proof corresponding to the same person. In the affirmative case, the non-storage of the item of non-repudiation proof which was being verified against the rest, if the latter has not yet been stored, can be performed, or the non-repudiation registrations having an item of identity proof of one and the same voter can be marked as duplicates. The extracted item of identity proof or a representation thereof (e.g., a known identifier of the voter) could be attached to the stored non-repudiation registrations to facilitate the future implementation of this stage. To extract the item of identity proof from the biometric characteristics, biometric algorithms in accordance with the format of the item of biometric proof will be used. For example, if the item of biometric proof is a handwritten registration, an algorithm identifying a person from his handwriting characteristics would be used.

In another preferred implementation, this stage of detecting duplicate non-repudiation registrations is performed by using an item of identity proof obtained from the item of biometric proof contained in the item of non-repudiation proof, which has been previously extracted and stored within the item of non-repudiation proof or next to it. This item of identity proof could have been extracted using biometric algorithms during the stage of generating the item of non-repudiation proof or subsequently.

Another optional stage contemplated in the invention consists of detecting non-validated voter registration information. This stage consists of verifying if a piece of stored voter registration information matches one of the items of non-repudiation proof stored. This match is based on verifying at least if the item of integrity proof of the voter registration information matches any of the items of integrity proof contained in the items of biometric proof used to generate the items of non-repudiation proof stored. In the affirmative case, the voter registration could be marked as validated or as non-validated in the negative case. To obtain the item of integrity proof of the registration information and the items of non-repudiation proof, the processes described above can be used in the optional stage of validating the items of non-repudiation proof.

In an alternative implementation of the invention, the use of hash functions is dispensed with, using a unique identifier provided by the registration module or the authorities managing the electoral registration before or during the stage of entering the registration information. In this case, the item of integrity proof would contain this unique identifier. The value of the unique identifier could be a random or sequential identifier related to the registration form or the voter himself. Examples of identifiers could be the social security number of the voter, an order number of the voter within a registration list, an order number of the registration form provided to the voter, etc.

In another alternative implementation of the invention, the voter would interact with the registration module by means of a registrar which would have access to the registration module by means of a controlled environment. In this sense, the voter would send the completed registration information to a registrar by means of a preferably secure communication channel, and this registrar would enter it in the registration module. This communication channel could be digital, analog or physical. Examples of supported communication channels would be Internet, a point-to-point communication network, fax or postal mail. A possible implementation of this alternative could consist of filling out a form in paper format with the electoral registration data and sending it through one of the mentioned channels to the registrar. It is also contemplated that the voter fills out this form electronically, for example using a specific registration program, text editor or PDF form. In that case, the voter could send the electronic form by means of a communication network and information sending tools, such as e-mail, or print it and send it by fax or postal mail to the registrar.

The invention claimed is:

1. A method for the protection of the integrity and authorship of a piece of registration information (103) belonging to a user (101), which can be used for a registration of said user (101) as a voter, wherein biometric techniques are used for the protection of said registration information (103), said method comprising for each piece of registration information (103) the following stages:
 a) entering (201) the registration information (103);
 b) protecting the integrity of the registration information (103) by implementing the following steps:
   i. generating (202) an item of integrity proof (104) of the registration information (103) from at least said registration information (103); and
   ii. displaying (203) the item of integrity proof (104) to the user (101); and
 c) generating an item of non-repudiation proof (107) of the registration information (103) by means of the following steps:
   iii. acquiring (204) an item of multiformat biometric proof (105) of the user (101) which contains the item of integrity proof (104);
   iv. creating (205) the item of non-repudiation proof (107) using at least the item of multiformat biometric proof (105) acquired; and
   v. storing (206) at least the item of non-repudiation proof (107).

2. The method according to claim 1, characterized by using a registration module (102) for implementing stages a) and b) and a validation module (106) for implementing stage c).

3. The method according to claim 1, characterized by using a single module for implementing stages a), b) and c).

4. The method according to claim 1, characterized in that in stage a) the registration information (103) is entered by the user (101) or a registrar (108) on behalf of the voter and using a controlled environment.

5. The method according to claim 1, characterized by generating the item of integrity proof (104) in step i) of stage b) by means of a hash function applied to at least part of the registration information (103).

6. The method according to claim 5, characterized by using as a hash function a cryptographic hash function, from the group comprising a MD5, SHA1 or SHA2, and/or an information compression function, from the group comprising a GZIP, RAR or WinZip function.

7. The method according to claim 1, characterized by generating (202) the item of integrity proof (104) in step i) of stage b) by means of a MAC function applied to at least part of the registration information (103) using a key known by the user (101) and/or the registrar (108).

8. The method according to claim 1, characterized by generating (202) the item of integrity proof (104) in step i) of stage b) from a complete or partial copy of the registration information (103).

9. The method according to claim 1, characterized by displaying (203) in step ii) of stage b) the information of the item of integrity proof (104) in an alphanumeric, graphic, audible or tactile format.

10. The method according to claim 1, characterized by displaying (203) in step ii) of stage b) a partial piece of information of the item of integrity proof (104) to the user (101).

11. The method according to claim 10, characterized by obtaining the partial piece of information of the item of integrity proof (104) from a set of most significant, least significant or random bits of said item of integrity proof (104).

12. The method according to claim 1, characterized by adding the item of integrity proof (104) to the registration information (103).

13. The method according to claim 1, characterized by capturing (204) an audible registration of the user (101) as an item of biometric proof (105).

14. The method according to claim 13, characterized by capturing (204) as an audible registration at least the voice of the user (101) explaining the content of the item of integrity proof (104), or at least a voice explaining or a sound representing the content of the item of integrity proof (104) and the voice of the user (101).

15. The method according to claim 1, characterized by capturing (204) a handwritten registration of the user (101) as an item of biometric proof (105).

16. The method according to claim 15, characterized by capturing as a handwritten registration at least the content of the item of integrity proof (104) written by the user (101).

17. The method according to claim 16, characterized by capturing (204) as a handwritten registration at least a graphic representation of the item of integrity proof (104) from the group comprising an alphanumeric representation, a barcode or a watermark, and a text written by the user (101) accepting said item of integrity proof (104) from the group comprising a handwritten signature or a word or phrase of acceptance handwritten by the user (101).

18. The method according to claim 1, characterized by capturing (204) a visual registration of the user (101) as an item of biometric proof (105).

19. The method according to claim 18, characterized by capturing (204) as a visual registration at least the user (101) visually explaining the content of the item of integrity proof (104) or at least the user (101) visually accepting a visible representation of the item of integrity proof (104).

20. The method according to claim 1, characterized in that in step iii) of stage c) the item of biometric proof (105) is used as an item of non-repudiation proof (107).

21. The method according to claim 1, characterized in that in step iii) of stage c) the item of non-repudiation proof (107) is generated (202) by concatenating the item of biometric proof (105) and at least the item of integrity proof (104).

22. The method according to claim 1, characterized in that in step iii) of stage c) the item of non-repudiation proof (107) is encoded.

23. The method according to claim 22, characterized in that one or the combination of symmetric, asymmetric, visual cryptographic algorithms or watermarks is used to encode the item of non-repudiation proof (107).

24. The method according to claim 1, characterized in that in step iii) of stage c) the integrity of the item of non-repudiation proof (107) is protected by means of a cryptographic algorithm from the group comprising a digital signature or a MAC function.

25. The method according to claim 24, characterized in that at least the user (101), a registrar (108) and/or a time sever participate in the protection of the integrity of the item of non-repudiation proof (107).

26. The method according to claim 1, characterized by comprising an additional stage of storing at least the registration information (103) in a registration module (102), a validation module (106) and/or a third independent module.

27. The method according to claim 26, characterized by comprising an additional step of encoding the registration information (103).

28. The method according to claim 27, characterized by using or the combination of symmetric, asymmetric, visual cryptographic algorithms or watermarks to encode the registration information (103).

29. The method according to claim 26, characterized by protecting the integrity of the registration information (103) by means of a cryptographic algorithm from the group comprising a digital signature or a MAC function.

30. The method according to claim 29, characterized in that at least the user (101), a registrar (108) and/or a time server participate in the protection of the integrity of the registration information (103).

31. The method according to claim 1, characterized by comprising an additional stage of validating an item of non-repudiation proof (107), which consists of verifying if the item of non-repudiation proof (107) has been generated based on an item of integrity proof (104) of any piece of registration information (103) entered.

32. The method according to claim 1, characterized by comprising an additional stage of validating duplicate non-repudiation registrations (107) consisting of verifying if there is a stored non-repudiation registration (107) which has been generated by the same user (101) as another non-repudiation registration (107) to be stored or already stored but different from the compared one.

33. The method according to claim 1, characterized by comprising an additional stage of verifying the existence of non-validated registrations, consisting of detecting registration information (103) entered in a registration module (102) for which an item of non-repudiation proof (107) has not yet been stored.

34. A system for the protection of the integrity and authorship of a piece of registration information (103) belonging to a user (101), which can be used in a registration of a voter, for implementing the method described in claims 1 to 33, characterized by comprising:

d) A registration module (102) configured to enter a piece of registration information (103) and generate an item of integrity proof (104), comprising:

vi. data input/output means for entering a piece of registration information (103) and displaying an item of integrity proof (104) of said registration information (103); and         vii. processing means which allow generating (202) an item of integrity proof (104) of the registration information (103); and     e) a validation module (106) configured to acquire a piece of biometric information and store at least one item of non-repudiation proof (107), comprising:

viii. means which allow capturing a piece of biometric information from which an item of non-repudiation proof (107) will be obtained.

35. The system according to claim 34, characterized in that at least part of said input/output means of said registration module (102) are a device for capturing physical information from the group comprising a document scanner, a photographic camera or a Braille reader.

36. The system according to claim 34, characterized in that at least part of said input/output means of said registration module (102) are a device for capturing analog information from the group comprising an analog sound recorder, an analog telephony system or an analog camera.

37. The system according to claim 34, characterized in that at least part of said input/output means of said registration module (102) are a device for capturing digital information from the group comprising a communication network, a digital sound recorder, a digital telephony system or a digital camera.

38. The system according to claim 34, characterized in that at least part of said capturing means of said validation module (106) are a device for capturing biometric information in physical format from the group comprising a device for scanning documents or a device for capturing fingerprints.

39. The system according to claim 34, characterized in that at least part of said input/output means of said registration module (102) are a device for capturing biometric information in analog format from the group comprising a device for capturing analog audible information or a device for capturing analog visible information.

40. The system according to claim 34, characterized in that at least part of said input/output means of said validation module (106) are a device for capturing biometric information in digital format from the group comprising a device for processing audible biometric information in digital format or a device for processing visible biometric information in digital format.

41. The system according to claim 39, characterized in that the validation module (106) additionally comprises analog or digital storage media for storing at least the item of non-repudiation proof (107).

* * * * *